May 4, 1926.
E. H. CORLETT ET AL
MAP AND METHOD OF MAKING IT
Filed Sept. 5, 1922   3 Sheets-Sheet 1
1,583,125
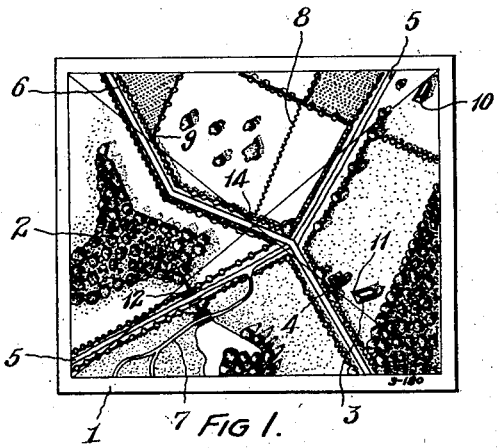
FIG I.
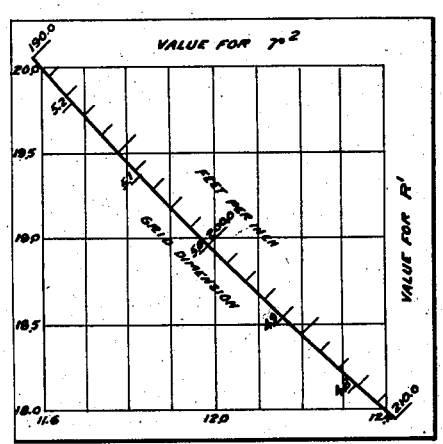
FIG. XI.
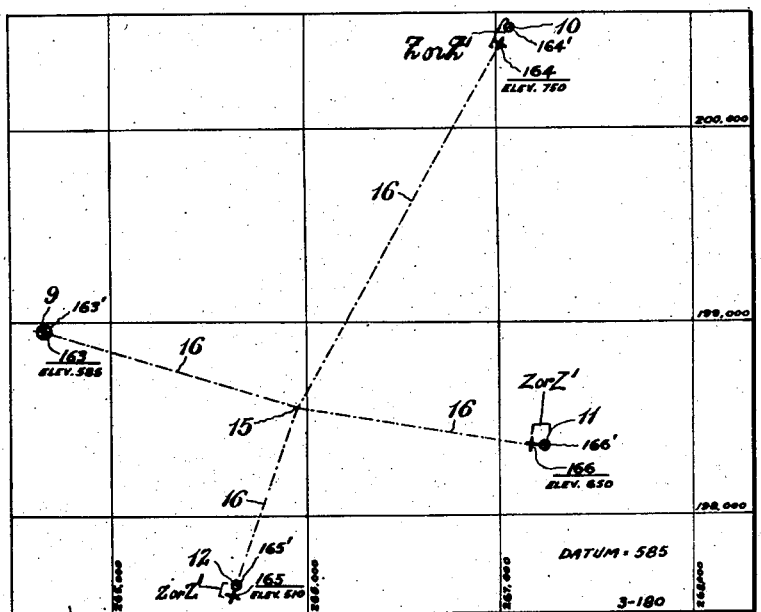
FIG II.
INVENTORS:
EDWIN H. CORLETT
MAX W. GARNETT
HOWARD I. DOREMUS
by their atty May 4, 1926.
E. H. CORLETT ET AL
1,583,125
MAP AND METHOD OF MAKING IT
Filed Sept. 5, 1922    3 Sheets-Sheet 2
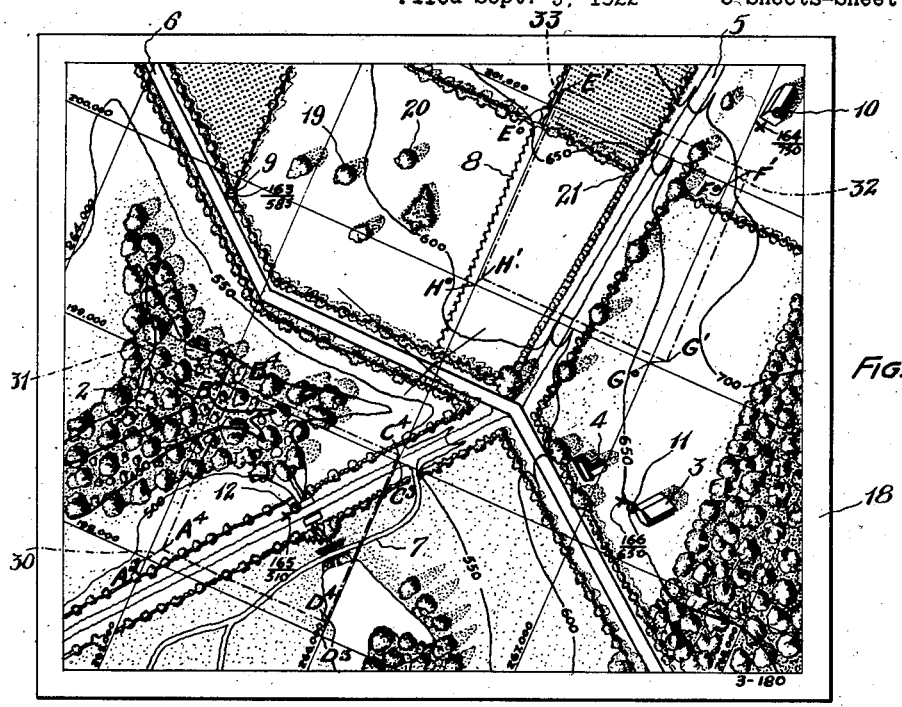
FIG. III.
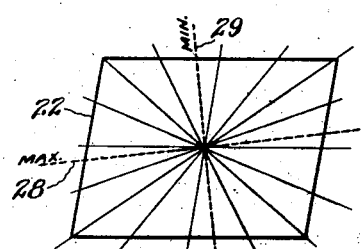
FIG. IV.
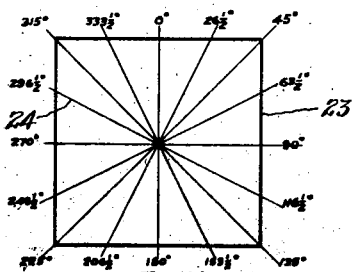
FIG. V.
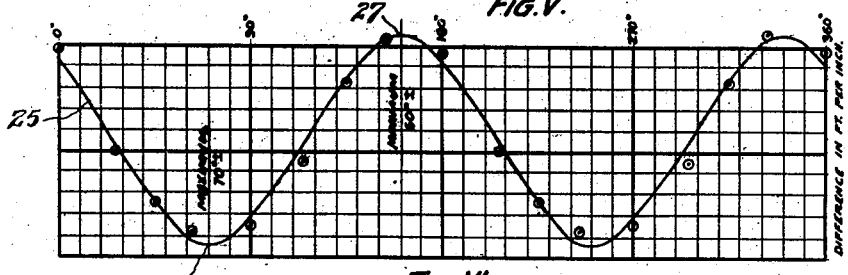
FIG. VI.
INVENTORS:
EDWIN H. CORLETT
MAX W. GARNETT
HOWARD I. DOREMUS
by their atty May 4, 1926.
E. H. CORLETT ET AL
MAP AND METHOD OF MAKING IT
Filed Sept. 5, 1922  3 Sheets-Sheet 3
1,583,125
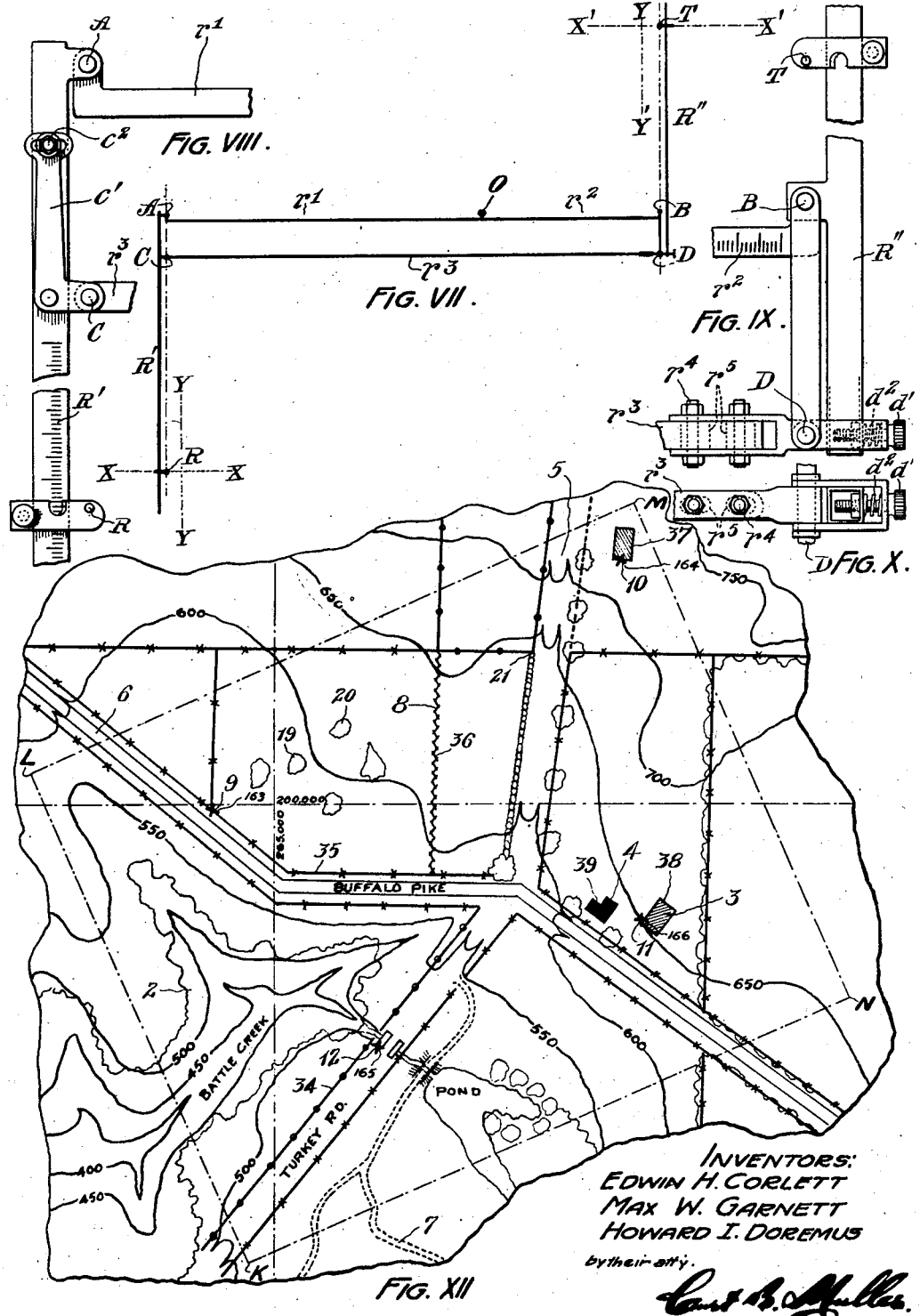
FIG. VIII.
FIG. VII.
FIG. IX.
FIG. X.
FIG. XII
INVENTORS:
EDWIN H. CORLETT
MAX W. GARNETT
HOWARD I. DOREMUS
by their atty.

Patented May 4, 1926.

1,583,125

UNITED STATES PATENT OFFICE.

EDWIN H. CORLETT, MAX W. GARNETT, AND HOWARD I. DOREMUS, OF EAST CLEVELAND, OHIO.

MAP AND METHOD OF MAKING IT.

Application filed September 5, 1922. Serial No. 586,391.

*To all whom it may concern:*

Be it known that we, EDWIN H. CORLETT, MAX W. GARNETT, HOWARD I. DOREMUS, all citizens of the United States of America, all residing at 1822 Marloes Ave., East Cleveland, in the county of Cuyahoga and State of Ohio, have invented a new and useful Improvement in Maps and Method of Making Them, of which the following is a specification, the principle of the invention being herein explained and the best mode in which we have contemplated applying that principle, so as to distinguish it from other inventions.

Our invention entitled Map and method of making it pertains more particularly to employment of an aerophotograph or photographs disclosing the terrain or portion of the earth's surface of which a topographical map is desired.

The object of our invention is to facilitate, expedite and cheapen the production of a topographical map.

For convenience, we actually mark an aero-photograph or corrected enlargement thereof by sketching thereon topographical designations including contour-lines and thereafter transfer each contour to map material on an increasing or decreasing ratio according as each particular different elevation is learned to be above or below an arbitrarily chosen horizontal datum plane, or in other words on a ratio which is a function of the scale of an assumed datum plane, of the vertical location of the contour with respect thereto and of the scale desired for the map.

Having an aerophotograph, a plurality of identifiable feature points thereon (preferably four) are selected, then the location of said points relative to each other and relative to a chosen datum plane is determined by standard ground survey practice, next we determine the average scale of the picture by platting on a blank sheet the four points to define a plane figure of three or more sides and measuring its sides, then we locate the center of the picture assuming said center to lie in the axis of the aerocamera lens, and further transfer said center by approximate determination to said plat, measure the distances in inches from the determined center of the plat to each of the four points, multiply each of the four distances by the difference between the elevations of the datum plane and each particular one of the four points respectively to which the distance from the center of the plane figure was measured, divide each of the four products by the product obtained by multiplying the scale of the picture and a number which is the focal length of the lens of the aero camera, said product being the altitude of the aero camera at the time of exposure, lay off by measurement from the known center of the plat the four quotients so obtained having due regard to the algebraic sign of each, correct the photograph or photographs by optical projection and rephotograph at an adjusted angular disposition of each original picture with respect to the focal plane so as to eliminate elements of horizontal perspective by which we mean the apparent perspective of lines on a horizontal plane as distinguished from lines in vertical planes, and incidentally enabling obtainment of pictures uniform in scale excepting for possible rectilinear distortion, grid the corrected photograph or photographs according to coordinates, emphasize and describe the feature points and sketch the contours with respect thereto directly upon the photographs and finally transfer the results by pantograph as a continuous map of uniform scale.

Our invention is believed to have enabled making commercially successful as well as practicable the idea of observing the elevation of features on the surface of the earth by means of an aerophotograph thereof, in other words, using the disclosure of an aerophotograph for collecting data as to elevation of different portions of the earth's surface. The step of determining the elevations of prominent features on the terrain by identifying the location thereof according to photographic detail is the primary useful conception which we hope to protect by patent. Subsidiary ideas are the elimination of elements of perspective and effecting, when a series of aerophotographs is employed, a general average of uniform scale thereof. If the photograph of the terrain which almost invariably involves elements of perspective is used without being first corrected by the elimination of horizontal perspective, a topographical map could be produced which would reveal the mere existence of topographical detail, but not the exact scale location thereof. While correction for horizontal perspective could subsequently be made it is preferable to use a corrected photograph in order to avoid an additional copying procedure. If a topographical map were to be made of an area which did not exceed the ground covered by a single aerophotograph it would generally be most helpful first to correct for elements of horizontal perspective such as, for instance, shifting the base of a tree to its proper place. Bringing to proper scale could later be readily accomplished. If, however, the area of which a topographical map is desired is extensive enough to require a series of photographic pictures thereof, and without a willingness on the part of a customer to support the cost of a map requiring conformity with strict specifications, it would ordinarily be preferable to first bring the photographs to a uniform scale.

Contrary to general opinion, an aerophotograph, even if taken mathematically vertically, is not a true plan. Depending upon the use to which it may be put, it may be called an approximation of a true plan. Until notice, in this dissertation it will be assumed that the aerophoto was taken exactly vertically and that, therefore, there is no horizontal perspective therein. If there be any relief on the terrain, the vertical elements thereof will appear as real or imaginary lines on the aerophoto, all radial to the point on the terrain lying within the axis of the lens of the aerocamera. If J be the altitude of the lens above a datum plane of elevation and if $h$ be (considered algebraically) the difference in elevation between the datum plane and that of a point in relief (that is, the length of the line from any point perpendicularly to the datum plane), and if $b$ be the distance on the aerophoto from the point in the axis of the lens to the image of the point in relief, then the actual displacement of the point radially, or along a line which radiates from or passes through the nadir point on the terrian in a vertical optical axis of the aero-camera at the moment of exposure and which point may be said to be the vanishing point of vertical perspective, is a distance which we shall call $z$. Therefore:—

$$1. \quad z = \frac{hb}{J}$$

($h$ and J in units of feet; $z$ and $b$, in units of inches) and the correction to apply in order to locate properly the point on its radial line is $$2. \quad -\frac{hb}{J}$$

and obviously the correction to apply to the platted position of the point to produce its aerophotographic location is the same distance, but which when reckoned in a different formula we call $z'$ so that $$3. \quad z' = \frac{dh}{J-h}$$

($h$ and J in feet; $z'$ and $d$ in inches), where $d$ is the distance from the axial point to the platted (orthographic) position of the point in relief. If the distances between the small crosses and circles in Figure III are considered as $z$ then the same distances in Figure II should be considered as designated by $z'$. The above formulæ are derived and mathematically proven in the following manner:

Considering S as the nadir point, in an assumed datum plane, of the center of the lens.

Considering U as a point in the same datum plane and as the base of the perpendicular line from the assumed point which is the vertical distance $h$ above the datum plane.

Considering V as a point in the datum plane which is also in a straight line passing through the lens and through the point which is at the elevation $h$ above the datum plane.

Then:

$z/b$=UV/SV=$h$/J. $z=hb$/J which is the correction for the print.

$z'/d$ = UV/SU = $h$/J—$h$. $z' = dh$/J—$h$ which is the correction for the plat.

The units of $h$ and J should be the same, say, feet.

The units of $z$, $d$ and $b$ should be the same say, inches.

These expressions are true regardless of the scale of the aerophoto, whether it be a contact print or an enlargement or reduction; and, regardless of the focal length of the lens employed in making the aerophoto.

It will be apparent from the above that the correction of any limited number of points on an aerophoto is merely a matter of detail of more or less tediousness, but that the transferring of detail from an aerophoto to map paper in any quantity would appear to entail an immense amount of work and a cost out of all proportion to the value of the information gained. We will show that a process has been worked out and put into practice commercially which enables one skilled in the art, or generally technically proficient, to shorten and cheapen the making of any type of general or special map by using aerophotographs.

There are two causes operating to prevent an aerophoto positive (contact print or enlargement) from containing uniform scale in all directions. The first (in point of time in the process) is that it requires an appreciable time for the slit in the focal plane shutter to travel across the film or plate; and in that time the camera may have one or more of several motions imparted to it. It will be travelling with the aeroplane; and it may be rotating with a constant or a variable velocity about a line that may lie within the plane of the film or plate, or without the plane of the film or plate and parallel to it, or that may not be parallel to it and may or may not intersect the film or plate; and the line described may be rotating in any fixed or variable position about another line which itself may be travelling in a straight plane or a plane curved in two or three dimensions. In other words, the aeroplane may be following any sort of a line, and the camera may be moving with respect to the aeroplane. (It is now assumed that the motion of the slit is uniform—in fact it can be only approximately so; and later we shall deal with this feature.) However, in the face of all these possibilities, one is safe in assuming that the only resultant distortion detectable will be caused, in most instances, by the velocity of the plane with respect to the ground; and, in a few instances, by a slight angular motion of the plane, or possibly the camera, at the time of exposure, about a line approximately parallel to the sensitized surface. It does not need any discussion to show that the resultant maximum and minimum scale distances on the aerophoto can be resolved into two components. We are not prepared to state definitely that these are always at 90°; but, as far as adapting the method to be outlined to any practical problem is concerned, they are either at 90° or approximately that. The focal shutter distortion disappears if a between-the-lens shutter be used. At this writing, the latter type has not been developed to be as fast as the focal plane shutter.

The second cause producing scale distortion on the positive is the absence of uniform swelling or shrinking in photographic material. It is likely that glass plates and celluloid plates are so free of this feature of lack of uniformity as to be said to expand and shrink uniformly. It is further likely that glass plates expand so slightly that for map purposes they may be called perfectly rigid surfaces. The gelatine may crawl uniformly or not. It is our belief that, for all time, this may be disregarded in mapping because distortion due to it is so slight. Photographic paper, requiring wetting in the process of obtaining and fixing the image, will very probably always swell and shrink non-uniformly. The action, above described, of photographic materials, will produce two component scales, subject to the same basic restrictions as are the component scales resulting from shutter distortion. While shutter distortion, especially if it be large, is troublesome and difficult to correct, "process" or "development" distortion can easily be found and allowed for, it involving only a comparison between the same sheet before and after development. Finally, any scale distortion due to the shutter, and any due to swell or shrink, combined make two component scales, either exactly or approximately at 90°.

Now supposing the aerophoto has been so taken that there are in its elements of horizontal perspective—in other words, that the sensitized surface was not parallel to the terrain when exposure was made. This means that the lens was not vertically over the axial point on the terrain at the time of exposure. In a joint application for patent by E. H. Corlett and M. W. Garnett filed May 14, 1920, Serial Number 381,402, the "four point" principle and its application to this problem is thoroughly discussed; and in using that process, an accounting is made for differences in elevation on the control points. We do not limit ourselves to the necessity of using four points to determine the scale of a picture merely because our drawings disclose four points, and we used that in illustration of a practical method of effecting our system. We realize that, where the accuracy of the finished map is of less moment or where the skill in keeping the camera level is greater, or both,—there is presented the possibility of using three, or or even two points to determine a scale acceptable for that of our datum plane, or assumed, even, to be the scale of the picture as a whole. Also, we mean to cover the contouring of uncorrected photographs, prior to, during, or after the determination of scale, by a determination of the spatial relations of a plurality of identifiable points on each of the photographs involved. Briefly, four points, identifiable on the aerophotograph (preferably, points which are, for economy, on one or more adjoining photographs) are chosen by the chief of the survey party as tie points for his survey. These points are located and elevations noted thereto by anyone of various methods in current use in survey practice. Then, a sheet is prepared with these points platted thereon, preferably to the scale of the finished map. From these points, and the points on the contact print, a comparison is made which permits the calculation of a very rough scale, regardless of elevation, of the print (or negative—it is generally immaterial, though the negative gives better results). It is temporarily assumed that the center of the print is the image of the axial point and the image of the point vertically below the camera on the terrain; and a series of short approximations and comparisons will locate, on the plat, approximately the axial point. Through this point and the various control points radial lines are lightly drawn. Then inspection of the aerophoto, together with personal knowledge of the terrain by the person making the survey, determines the elevation of a plane that will most nearly approximate the elevation of that portion of the terrain which is most likely to be of interest to the user of the aeromap. The elevation of the control points being known, the correction according to the third equation earlier furnished is applied, giving to scale the position of the control points for that particular aerophoto, when relief is taken into account. Obviously, while the platted location of any one control point to coordinates according to survey, will be the same for two overlapping aerophotos, the position corrected for relief can not be the same, expressed in coordinates, unless the control point lies on a straight line connecting the vertical points and unless the elevation of the points is the means of the elevations of the two datum planes. This is merely a mathematical way of stating that, regardless of anything that can be done to the elements of a mosaic, relief in the terrain precludes any possibility of universally matching the elements in every detail—in fact, they can be matched only on points that lie in a horizontal plane common to all the aerophotos of the set, excepting under the condition above laid down (in being assumed that aerophotos are placed according to survey and not juggled slightly to produce an appearance of approximately matching). Then the control points, in their corrected positions, constitute the four points in the patent application of Corlett and Garnett.

Of the several method described therein for effecting perspective correction, the one actually in use is that involving a lens of a focal length such that its position with respect to the negative in the projection machine is approximately the same as the position of the aerocamera lens with respect to the negative at instant of exposure. The plat is mounted on the tipping easel and the latter is manipulated until coincidence of the four control points with the projections of the four indentifiable points (either from the negative or from a hand copy therefrom) is effected. Then the positions of the lens with respect to the negative and the fixed points easel are noted, together with tip and turn of the movable easel—its horizontal turning and its vertical tipping. The lens observations take the following form:

$Q'$ = distance from lens to projected image recording surface.
$F'$ = focal length.
$P'$ = observed distance lens to negative (or to sheet with transcribed points used in place of negative.)
$D'$ = observed distance negative (or sheet, etc.) to the fixed point of the easel.
$T'$ = observed rotation about vertical axis of easel.
$B'$ = observed rotation about horizontal axis of easel. Then, $$D' - P' = Q' \quad \left(\text{Standard formula: } \frac{1}{P'} + \frac{1}{Q'} = \frac{1}{F'}\right)$$

and $$\frac{Q'}{P'} = \text{ratio of enlargement, as observed.}$$

From a table, the ratio of enlargement is used to find $P'$ and $D'$ in order to reset the correction machine so that there will be the sharpest possible focus. Sometimes the observed ratio of enlargement is modified by a function of the one or two component rates of expansion of the enlargement paper before the true $P'$ and $Q'$ are looked up.

This operation is followed for the required number of aerophotos. When the data is collected, the negatives, one after another, are loaded into the machine, the required setting made for each, and each is exposed. The result is a set of enlargements, all to a fairly uniform scale, containing (assuming no error in survey or in carrying out the above described process) no variation in scale, on any one enlargement. However, several things may happen. If the ratio of enlargement is considerably different from that used in determining the lens for the process, a square on the ground (according to the joint application Corlett-Garnett) will be corrected into a rectangle; and if there is any appreciable shutter distortion, it would have the effect of transforming the same square (specifically chosen for the discussion involving the lens) into a parallelogram—perhaps into a rectangle, depending solely upon the directions of the distortions. In adjusting our enlargements for elimination of perspective, we make no distinction between these factors. If we cannot obtain a perfect coincidence, we try to obtain an adjustment of a nature such that proportional change of dimension of the projected image along a set of parallel lines (which we do not yet produce by optical apparatus) would give us coincidence. This means that, on the projection board (easel) and independent of other causes, we have two component scales. (The difference in these two component scales seldom is other than negligible, on the projection board.) Then there is another factor that may enter here. If the angular displacement of the easel is considerable, we shift the approximated position, on the plat, of the point scaled in as the axial point and assumed to be approximately coincident with the point vertically under the camera at the instant of exposure. (It is to be understood that the last mentioned point is not a true point, as the plane is moving—but, consistent with our other assumptions, anything that will come within the limits of scaling is a close enough approximation of the mathematically correct quantity or representation.) When a line through the lens and perpendicular to the displaced easel gives us a point on the plat through which we may draw radial correction lines that will, with the application of the third equation, give us the best possible approximation of superimposition (bearing in mind the distortion likely to be produced as described in the first part of this paragraph) of projected points on to the corrected location of the platted control points, an unusual tip of the aeroplane or camera is thereby registered.

When the enlargement is dried, it is ready for one of two things: incorporation into a mosaic or use as a location sheet in obtaining other field information and in making any other sort of a map, even a contour map. When used in a mosaic, it may require exposing for more than one datum plane and piecing together in any way that will best convey the desired information. If the component scales are too widely divergent, it will necessitate making the enlargement so that its minimum scale equals the scale of the map, and cutting often across the dimension of the maximum scale and lapping, so that no important detail will be missed. This way the overlap scale will be correct, and the error in short lengths due to the difference of the maximum component from the map scale will be negligible.

Where the enlargement is to be used as the basis for other work toward the production of a drafted map, the procedure is as follows:

The enlargement, either mounted or unmounted, is gridded. This is done by bringing the control points on the enlargement out of relief, so to speak, by means of equation or formula (2) referred to above. Then, by simple proportion, the coordinate grids are placed on the enlargement (this by comparisons, from the grids on the plat). Now, if the grids so placed upon the enlargement are parallelograms of 90° or otherwise (in popular language, parallelograms or rectangles), all the scale work up to this point has been correct—survey, choice of points, plat correction previous to using in Corlett-Garnett machine, perspective adjustment, adjustment observations, actual process of enlargement, and gridding. If the grid figures are rectangles, it means that the component scales happen to coincide with the directions chosen for grid lines (generally NS and EW). If the figures are squares, it means that the sum of all the errors is zero, excepting that the ratio of enlargement may have been figured wrongly, or used wrongly. This last is not important, as transference is mainly by pantograph.

It will be assumed that a description of the method of making contour maps will cover the making of all other forms of scale terrain maps. The gridded enlargement is taken into the field by a party made up of two or more men, equipped with a plane table (minus alidade), a level, a rod, a hand level and customary incidentals of topographic surveying. (It must be remembered that one man could get topography with the enlargements provided he could find a reliable means of obtaining elevations. A theoretically perfect barometer would answer. We detail a method found practical.) It is not necessary to detail the routine of contour location on the ground—that is standard practice with infinite variations. The variation from previous practice comes with the almost entire elimination of horizontal locations, by the use of the enlarged aerophotograph. Contours are put on the enlargement by identifying the position of the contour on the ground with points and objects on the enlargement. Sometimes each contour is located, sometimes controlling elevations are located and contours are interpolated—there is nothing new about this other than recognition of the contour and contourer's locations via photographic detail. The elevations, with our system, are obtained by direct levels. They could be obtained by any economical and correct method. The contours are placed on the enlargements according to photographed features of the terrain excepting where identification is impossible or too expensive. There ordinary survey methods are used; and the resultant information is not confused by vertical perspective. The contours are inked, together with all information that might be apparent in the field but not so to the draftsman—fences, buildings, etc.

The information on the contoured enlargement is pantographed onto the map sheet. In order to do this, it is necessary that we know the scale of the enlargement as a whole, or part by part, in case there seems to have been trouble anywhere in the processes up to this stage. If the grid figures are rectangles, a simple scaling will give the component scales. If the angles are appreciably different from 90°, the components scales can be found as follows: Considering any one grid figure we locate on the perimeter of it, by purely geometrical means, enough points so that lines through these points and (preferably) the center of the figure will give radial lines at about every 20° or 30° of the circle. Locate the corresponding geometrical points on a standard square grid figure. Determine the scales along the radial lines in the skewed figure. Plat a curve of arithmetical differences of these scales from the standard as ordinates and with azimuths (and their supplements) as abscissas. A harmonic or sine curve can be drawn as a mean to the platted points. If the crests are 180°± apart; and, the troughs, the same; and, trough and crest are 90°± apart; we have another check as to the accuracy of operations thus far. (Even where the troughs and crests are not precisely as stated for best results, we find that a rather rough approximation along this line gives sufficiently close results.) It is obvious that such a curve gives, by inspection and at once, the maximum and minimum scales and the azimuths of each. These are noted on the enlargement. I do not limit myself to the method outlined above as I am aware that other methods can be used to determine the maximum and minimum scales. In our practice, it is seldom necessary to do this, as the variation from 90° of the grid figures is seldom of an amount sufficient to prevent the use of the figures as they are, within any reasonable limit of error for a scale map. (In any case, the map as a whole will be as good as the control survey—or the data used as controls—and no one can except to scale very small distances within a great degree of accuracy.)

The grids as laid out, according to previous description, are true to photo-scale only upon a certain datum plane. All contours, features—map data in general—on or nearly on that plane are transferred, according to that scale, the setting of the pantograph having been determined therefrom. Then, using the equation number (2), a new set of grids is penciled on the photo (generally only at intersections). For the lower elevations, the grids on the enlargement will obviously have a smaller scale and for the higher, a larger scale. This is because high ground is the nearer to the aerocamera. As these corrections are mostly always of the order of less than 0.05" per single adjustment, the breaks in continuity in the map as pantographed can be eased in free hand without letting in any error of a destructively large quantity. This process is followed, enlargement by enlargement, to the completion of the pencilling of the map. When desired this map can be inked or traced in any well known manner.

Such is the process as at present constituted. It is theoretically and practically correct (within the limits of standard map accuracy and according to various qualifications mentioned as possible divergencies of "good-enough" practice from exact theory). Wherever there is any doubt as to the location of a grid line, rather than to determine it, in the field and office, we rely upon comparisons with adjacent pictures. Pantographing does not proceed until there is coincidence of grids, enlargement to enlargement, with due allowance made for what difference there may be, if any, in the elevations of the datum plane of the one enlargement and that of the second.

In this whole matter, the following are new features:

A. A method for applying relief correction to aerophotos and to data obtained therefrom, based upon the altitude of flight and the approximate location of the point vertically under the camera at time of exposure within the limits of accuracy imposed by the users of scale maps.

B. A method of correcting horizontal perspective as described in Corlett-Garnett application.

b. Where the relief is considerable, "A" must be applied in preparing to use "B."

C. A method of locating contours upon paper in the field, involving the identifiability of locations in most places by inspection of an aerophotographic product, either a contact print or a projection, or an enlargement. (We have used the term "enlargement" here referring to any photographic print made by projection instead of direct contact printing.)

D. A pantograph embodying several new and cheapening features.

E. A chart to enable the user to set the pantograph so that it will, within practical limits, transfer data on two different scales to a drawing of one uniform scale, i. e.: bring an ellipse to a circle according to any previous intent.

F. A method for determining the amounts and azimuths of maximum and minimum scales in a parallelogram compared to a standard square.

G. A method, derived from "A", of producing an orthographic contour map from an aerophotographic product which has been contoured and filled with information in the field.

General summary: a process for gathering field information, using aerophoto products; and a process for transferring such information to a drafted map and in such process, a method for eliminating error due to shutter distortion, to uneven material expansion, slight discrepancies in survey and for eliminating vertical as well as horizontal perspective; the whole shortening and cheapening the production of feature and topographic—in general, scale,—maps.

Adverting to the drawings:—

Figure I is a facsimile reproduction of the essential features of a terrain photograph (contact print) as initially obtained with elements of perspective, with the location of survey control points indicated thereon.

Figure II shows a sheet of coordinate paper with a plurality of control points plotted thereon.

Figure III is an enlarged copy of the photograph shown in Figure I though additionally corrected so as to have no horizontal perspective but possibly rectilinear distortion and supplied with grids corresponding to those shown in Figure II, the data in the indicated rectangle having been obtained from an aerophoto.

Figure IV portrays an irregular quadrilateral figure as an exaggerated illustration of the difficulty experienced due to rectilinear distortion. Such a figure is to be corrected into a square.

Figure V is the equivalent square of Figure IV.

Figure VI shows a curve plotted to effect the determination of the magnitudes and azimuths of maximum and minimum scales.

Figure VII is a diagrammatic view of a pantograph provided with our adjustable connections.

Figure VIII is a detail view showing the manner of effecting adjustment on the left side of the pantograph shown in Figure VII.

Figure IX is a detail view showing the manner of effecting alining adjustment on the right side of the pantograph.

Figure X is a bottom plan view of Figure IX.

Figure XI is a reproduction in effect of a chart to be used with the pantograph for the purpose of determining certain values.

Figure XII is a broken section of the finished map.

In order the better to emphasize the salient features of our invention, the procedure will be detailed. Figure I shows a contact print of a negative made by an aerocamera. Thereon are shown a wooded valley, 2, a barn, 3, a house, 4, an unimproved road, 5, a paved highway, 6, a farm road, 7, a rail fence, 8, and other data, nearly all of which is recognizable by inspection. In this particular case, we will assume that a traverse is run along the highway, 6. From this traverse, ties are made to features identifiable on the print, and in the general vicinity of the diagonals thereof. Ideally, of course, points at the very corners of the area covered by the print, 1, would best serve the purpose; practice, however, is an approximation to this conception. In this case, the ties are made to a fence corner 9, the end of the ridge of a barn roof 10, the corner of a barn 11, and the end of a head wall of a culvert 12. In the notes of the survey, and henceforth in the drawings and in this description of the method, these points are numbered 163, 164, 166 and 165 respectively. Elevations of these points are determined coincidentally with their horizontal locations and on Figure II, are marked as 585, 750, 650 and 510 feet respectively.

In Figure II, a sheet of paper 13 is shown with the locations of the control points (163, 164, 165 and 166) platted thereon as indicated. In our process we plat by coordinates, though that is immaterial. Coordinates are shown thereon, as also are the designations and elevations of the control points. The center 14 of the print 1, Figure I, is determined by the intersection of diagonals. By comparison and measurement, this center is transferred to the plat, 13. Because the apparent positions of the control points on the print 1 are not their true positions with respect to each other (due to horizontal perspective, relief, shutter distortion, paper expansion, etc.) the exact location of the center 15 on the plat 13 cannot be made. However, the approximation reached is close enough in most cases. The case where it will not serve has been previously discussed.

On Figure II the little circles are the photographic locations and the crosses are the actual or correct locations.

From the center, 15, and through the control points, radial lines 16 are drawn. Then, it is assumed that a corrected photograph, true to scale upon a plane that passes through the point 163, will best serve all purposes. Therefore 163 is assumed to be on the datum plane, the elevation of which is then 585 feet. Now, the point 165 is below the datum plane, so its photographic position will be between the true point and the center. In passing, we remark that the picture center is assumed to be both the point on the axis of the lens and the point vertically below the camera at the instant of exposure. Points 164 and 166, on the plat 13, Figure II, however, are higher than the datum plane; therefore their photographic locations will be outside their true locations. Within the limits of scale location, a radial offset depends directly upon variation of elevation from that of the datum plane and upon the location of the control point with respect to the center, and depends inversely upon the altitude of the camera above the datum plane. Whether the offsets are made toward or away from the center depends upon whether the point is below or above the datum plane. We will assume here that the camera was twenty-four hundred feet (2400') above the datum plane, then the offset $z$, is found thus:

$$z = \frac{\text{radius } 16 \times \text{relief } (750-585)}{2400 - (750-585)}$$

If 16 is in inches and "relief" and "2400" are in feet, then $z$ comes out in inches and fractions thereof.

The control sheet 13, as we call it, is then used according to the Corlett-Garnett process, as disclosed in their joint invention, to produce the corrected projection print 18, in Figure III. It must be remembered that the circles, 9, 10, 11 and 12 representing the photographic recordations of the control points, 163 to 166, on the print 18, Figure III, correspond to the encircled offset points 163' to 166' on 13, Figure II.

The projection print 18, does not require gridding prior to field use, but it is handy to have it gridded, because it aids in orientation, calculation of acreage covered etc. Therefore, from the photographic position of the control points on the print 18, the true positions are laid off, either by formula or by transference of the offset from the plat 13, Figure II. It is extremely unlikely that the corrected points on the print 18 will superimpose upon the platted points on the plat 13, because it is probable that the projection print material will not swell or shrink evenly. However it is safe to assume that it swells or shrinks uniformly in any one chosen dimension. Therefore it is a matter not requiring explanation in detail, to place the grids 264000 to 268000 and 198000 to 201000 properly upon the print 18, Figure III. The figures obtained may be anything except squares, though if the control survey has been correct, the platting and offsetting correct, the Corlett-Garnett process correct, and the expansion or shrinkage of the projection print uniform as mentioned, and the grid platting has been correct, the figures will be parallelograms. Obviously, if the camera were tilted at exposure, it is almost inconceivable that shutter distortion will be uniform with respect to the terrain. However, such variation from uniformity is negligible; and, as we said before, there is no shutter distortion with a "between-the-lens" shutter. The effect of shutter distortion on grid figures has been negligible in our practice.

The projection print 18, is taken to the terrain represented therein; and contours as required, exemplified by 450, 500, 550, 600, 650 and 700, are drawn in according to the coordination of data, obtained by any survey method, as to elevation, with data obtained aerophotographically, as to horizontal location. In the field we find that the base of say, a tree 19, Figure III has an elevation of 597 feet, and that a tree 20 has an elevation of 610 feet. Then it is a simple matter to sketch in contour 600 with respect to 19 and 20. Fence corner 21 may have an elevation of 648, and the ground have a slope of such a nature that a two foot rise to contour 650 will indicate a certain distance in a certain direction. This process is repeated until the data desired has been collected. In addition to contours, the nature of fences, the dimensions of structures, the nature of geological features and of vegetation may be noted, as also the proper outlines of objects identifiable in the field but not in the office. It must be borne in mind that the photograph shows a great deal more data than can be shown on a drawing; so that there are no large areas where identifiable objects cannot be found to enable the sketcher to locate properly the contours or other conventions of information.

We will assume that a grid figure, has a shape and size like the parallelogram 22 in Figure IV. In order to obtain the magnitudes and the azimuths of the maximum and minimum scales we compare it to a true square 23 of the scale desired on the finished map, as appears in Figure V. Points on the perimeter of the square 23 are laid out geometrically, so that corresponding points can be laid out on the grid 22. Azimuths are noted. Then, assuming the scale to be uniform in all directions on the square 23 the scales of radial lines 24 are determined and the variation of scale of each radial line noted. These variations and the azimuths corresponding are platted to rectilinear coordinates (any system would do—rectilinear is handiest). See Figures VI. A curve 25 is sketched in to approximate the platted points. Then 26 and 27 are the points on the curve 25 that give magnitudes and azimuths of maximum and minimum scale ratios, respectively. Laid out on the parallelogram 22, Figure IV, are the maximum scale ratio 28 and the minimum scale ratio 29.

Our pantograph, shown in Figure VII, when set up, is placed to function according to the maximum and minimum axes, determined as heretofore described. It includes a fixed length beam including sections $r'$ and $r^2$ on opposite sides of a fixed pivot O. Opposite ends A and B of the beam articulate with rods R' and R'' which may vary in length. A bar $r^3$ likewise articulates with the rods, R' and R'' at C and D respectively and in a parallel relationship with respect to the beam.

The length of R'' is generally taken as fixed, with us, 19.00". R' is varied. Within a short distance of their respective origins, motion in the direction of line XX of tracer R will produce very close to rectilinear motion of recording pencil T along line X'—

X', the amount of the motion being very close to proportional to the lengths of R' and R". $r^2+r'$ is a constant, with us, twenty-four inches. Within a short distance of their respective origins, motion of R in direction of line Y—Y will produce very close to rectilinear motion of T along line Y'—Y', the amount of the motion being very close to proportional to the lengths $r'$ and $r^2$. Where $R''/R'=r^2/r'$, any rectilinear motion of R will produce proportional rectilinear motion of T. Where $R''/R'$ does not equal $r^2/r'$, the motion of T is not rectilinear; but we have found that, for our purpose, the variation is well within the limits imposed by the necessities of proper map making. This is because the difference in the component scales is never so great as to strain the capacity of the contrivance or the elasticity of the process. The only precaution necessary is that the operator of the pantograph must exercise caution and not attempt to go too far beyond the origin he selects if there be great divergence between his maximum and minimum scales.

A—B—C—D is the controlling parallelogram of the pantograph. At A, B, C, and D are hinges, the hinge pins being taper mandrels, each fitted to its respective location. All wear is therefore easy to take up; and the machine is very easily dismantled. The figure A—B—C—D is brought to be a parallelogram by actual test of its performance rather than by measurement between hinge pins. The bar C—D is adjustable in length by shifting bolts $r^4$ in slots $r^5$; and the length A—C is adjustable via bell crank lever $c'$ and screw $c^2$. Furthermore, there is an adjustment at D by means of screw $d'$ and spring $d^2$ to insure, by a simple test, that T is on D—B produced. This test is to set the pantograph for true rectilinear motion and make the adjustment at D until R, the pivot axis O, and T are on the same straight line. What happens here is that D—B—T may be on a straight line while D—B—F are not; or A—C—R may not be on a straight line, but as long as A—B—C—D is a parallelogram, and R—O—T are brought into a straight line, any other flaw of the machinery is negligible altogether. This has been explained because, with the provisions noted, this pantograph will do all any pantograph will do, for accuracy; and it can be built very much cheaper than the so-called precision pantograph.

To instance the manner of use of the pantograph after having determined the proper ratios and considering the square shown in Figures II and III as bounded at the top by the coordinate line 200.000, at the bottom by the coordinate line 199.000, at the left by the coordinate line 266.000 and at the right by the coordinate line 267.000, and supposing both the upper and lower boundary lines of the particular grid square to measure 5.05 whereas it should measure 5.00 and supposing further that the two lateral boundary lines each measure 4.95 instead of 5.00 as they should, the user will refer to the diagonal grid dimension shown in Figure XI, will locate the point 4.95 thereon and from it will glance down along a straight line of vision to the bottom to obtain the value 12.04 as the setting for $r^2$ and similarly will locate on the diagonal grid line a point 5.05 and then glance to the left along a straight line of vision commencing at such point to obtain 19.2 as the setting for R' (see Figs. VII and VIII); to obtain the required factors. Therefore, by making the proper adjustment along R' and moving the point R from the lower left hand corner of the selected and identified grid square to the lower right hand corner thereof, the distance 5.05 may be reduced to the distance 5.00 as translated and recorded by the pencil point at T. Similarly after establishing the proper setting along the graduations on $r^2$ and moving the point R from the lower left hand corner of the selected and identified coordinate or grid square to the upper left hand corner thereof, the distance 4.95 is increased to 5.00 by the range of movement imparted to the point T. The ratio desired between distances lying in the axis X—X to distances lying in the axis X'—X' can be obtained by a setting to suit along the graduations on the R' scale. The ratio desired between distances lying in the axis Y—Y to distances lying in the axis Y'—Y' can be obtained by a setting along the graduations composing the $r^2$ scale. It should be understood that the point R is the tracer movable according to its predetermined secured position along the scale R' while T denotes the recording pencil.

On one chart as shown in Figure XI, we are able to determine the following from the distance in inches along a grid figure side (we use 1000 foot grids); the scale on the enlargement and the setting for the distance R' or $r^2$, as the case may be. Then, we use common pantographing practice for setting up to transfer, provided that Y—Y and X—X correspond substantially to the azimuths of the components of the scales of the aerophoto.

The coordinates as laid out on the print 18 apply only to the datum plane. For terrain above the datum, the figures above will be larger; below, smaller. Each grid intersection for any particular plane above or below the datum is determined as were the offsets of the control points on the plat 13, Figure II. For instance, refer to 30 and 31 to see treatment of grid figure to make it apply to terrain below datum plane and see 32 and 33 for treatment of grid figure to made it apply to terrain above datum plane. In each case a figure similar to the original grid figure is obtained, for lower planes, smaller and displaced radially toward the center; for higher planes, larger and displaced radially away from the center. (It is to be understood that "center" as used implies that the center of the picture is within reasonable limits, coincident with the point on the terrain vertically below the camera at the moment of exposure and also with the point on the terrain lying within the axis of the lens at exposure. When the Corlett-Garnett method has determined that the center is substantially removed from the point vertically below the camera at exposure, such point is approximately located; and is then used throughout the process in place of the "center".) The data within $A^4 B^4 C^4 D^4$, Figure III, is pantographed to the grid square whose north east corner is 266000—199000 on the map paper. Similarly, the data within $E'F'G'H'$ is tranferred to grid square whose north east corner is 267000—201000. In practice, a series of imaginary grids are used, taken often enough so that the sequence of transferred data from low ground to high ground is substantially smooth. The joining of pantographed data, from one plane to another, is done free hand. Figure XII shows a section of the finished map, with KLMN outlining the area covered by the aerophoto the treatment of which we have followed. 34, 35 and 36 are different sorts of fences, 37 and 38 are barns while 39 is a house. The other data are amply intelligible.

It must be understood that we do not limit ourselves to obtaining contours and other data by taking a photograph into the field. It is feasible to obtain data by survey in the field and to supplement it in the office with photographs. Our invention comprises the use of aerophotographic detail as part of all the horizontal location work in preparing scale maps. Naturally, this also applies to corrected mosaics, because, given the elevations of any set of points and the elevation of a datum plane upon which the scale is known, the positions of these points can be reduced from photographic to real, with respect to each other, within the limits imposed, for accuracy upon a scale map. It is also feasible to compare photographic location of an object "in relief", that is, above or below an assumed datum, as shown on more than one aerophoto, and to deduce from such comparison the horizontal location of the object with respect to any lines of reference upon the datum plane. Its vertical location is also deducible from such data. Our methods control all the data of the aerophoto to the accuracy of the control survey.

We claim:—

1. The method of making a topographical map which consists in contouring aerophotographs, and then tracing each contour on a ratio according to its elevation with respect to a chosen datum plane of the photographs.

2. The method of making a topographical map which consists in contouring in the field enlargements of terrain photographs taken at a high altitude, and then tracing each contour on an increasing or decreasing ratio according as its elevation was above or below a chosen datum plane of the adjusted photographs.

3. The method of making a topographical map which consists in shifting map points of aero-photographs so that their features will be correct to scale on one plane, then contouring said corrected photographs and finally tracing each coutour on a ratio according to its elevation with respect to a chosen datum plane of the corrected photographs.

4. The method of making a topographical map which consists in making an aero photograph, selecting a plurality of points, determining by ground survey the location of said points relative to each other and relative to a chosen horizontal plane, determining the scale of the picture, locating the center of said picture, transferring said points, transferring such center to its proper place between said selected points, scaling the distances from the determined center to each of the points, multiplying each distance by the different between the elevations of the datum plane and the particular one of the points respectively, dividing each of the several products by the product obtained by multiplying the scale of the picture and a predeterminable number, laying off the quotients so obtained by measurement from the center of the selected points, correcting the photograph by optical projection to eliminate elements of perspective and obtain a picture true to scale, coordinating the picture into sections, sketching directly on the photograph the feature points and contours and finally transferring onto map paper.

5. The method of making a topographical map which consists in taking an overlapping series of aero photographs, selecting four feature points, determining by standard survey practice the location of said points relative to each other and relative to a chosen horizontal or datum plane, determining the scale of the picture including the step of platting the points, locating the center of said picture, transferring such center to its proper place between said four selected points, scaling the distances from the determined center to each of the four points, multiplying each distance by the difference between the elevations of the datum plane and each one of the four points respectively, dividing each of the four products by the product obtained by multiplying the scale of the picture and a number determined by the altitude at which the aerophotographs were taken, lay off the four quotients so obtained by measurement from the center of the plat, correcting the photographs by rephotographing at an adjusted angular disposition of each picture with respect to the focal plane to eliminate elements of perspective and obtain pictures true to scale, coordinating the pictures into squares, sketching directly on the photographs the feature points and contours and finally pantographing desired map points and topographical designations of all the photographs as a continuous series onto map paper to obtain the proper uniform scale.

6. The method of making a topographical map which consists in taking an overlapping series of aerophotographs, enlarging them, selecting at least four feature points, determining the location of said points relative to each other and relative to a chosen horizontal or datum plane, determining the scale of the picture including the step of platting the four points to give a plane geometric figure to be used as a plat measuring the sides of such plane figure, locating the center of said picture, transferring such center to said geometric figure, scaling the distances from the center of the geometric figure to each of the four points, multiplying each distance by the difference between the elevations of the datum plane and each particular one of the four points respectively to which the distance from the center of the plat was measured, dividing each of the four products by the product obtained by multiplying the scale of the picture and a number, laying off by measurement from the center of the geometric figure the four quotients so obtained, correcting the photographs by optical projection to eliminate elements of perspective and obtain a picture true to scale, coordinating the picture into sections, sketching directly on the enlarged photographs the feature points and contours and finally pantographing the desired data of all the photographs as a continuous series onto map paper to obtain the proper uniform scale.

7. The method of making a topographical map which consists in identifying features on a portion of the terrain by reference to a single photograph thereof, contouring said photograph and finally transferring map points denoting said features to map paper according to their real relative locations.

8. The method of making a topographical map with the aid of an aerophotograph of the terrain of which a map is desired, which consists in eliminating from said photograph elements of perspective due to terrain relief, including the step of ascertaining the elevation of features common to the said photograph and to the actual ground comprehended thereby, the step of ascertaining the photographical displacement of said features and the step of drafting survey designations denoting said features in their true relative positions.

9. The method of making a topographical map which consists in eliminating elements of perspective in an aerial photograph, determining the elevation of features common to the actual ground and to said photograph, then sketching on said photograph topographical designations of said features in their apparent relative positions and finally shifting some of the relative positions of some of said designations by recording them on a separate sheet according to their known elevations.

10. The method of making a topographical map which consists in taking an aerophotograph of a certain area of the earth's surface, eliminating any existing distortion due to non-parallelism of the camera lens with relation to the earth's surface at the moment of exposure, observing and recording the apparent relative locations, by measurement and notation, of features of a topographical character and then effecting adjustment to bring said features to a uniform scale and transferring to a separate sheet.

11. The method of making a topographical map which consists in taking an aerophotograph of a certain area of the earth's surface, eliminating perspective due to non-parallelism of the optical plane of the taking lens with relation to the earth's surface at the moment of exposure, measuring and recording the apparent relative locations of features of a topographical character and then adjusting the relative positions of said features to their ascertained true and proper relationship and pantographically transferring them to different material according to the predetermined ratios required.

12. A photographic map having marked thereon a plurality of control points and a plurality of coordinate lines having a definite relation to said control points.

13. A map comprising a corrected aerophotograph having marked thereon a plurality of control points and also a plurality of coordinate lines the position of which is determined according to the relative position of said control points.

14. A map comprising a photograph of an area of the surface of the earth, said photograph being of uniform scale with reference to a chosen datum plane and having marked thereon a plurality of control points and a plurality of coordinate lines the relation of which is determined according to the ascertained elevation of said control points with reference to the same datum plane.

15. A map comprising a photograph of an area of the surface of the earth, said photograph being of uniform scale with reference to an assumed datum plane, having platted thereon four control points and having also marked thereon a plurality of coordinate lines the disposition of which is determined according to the ascertained relative elevation of said four control points with reference to the assumed datum plane and the size of the squares defined thereby varying according to the elevation of the assumed datum plane.

16. A method of making a topographical map which consists in obtaining an aerophotograph of the area to be mapped, locating and recording data concerning physical features of said area by direct observation thereof and by visual reference to feature points disclosed on said photograph, and then correctly drawing survey designations denoting said physical features in relative positions determined by a uniform scale.

17. A method of making a topographical map which consists in obtaining an aerophotograph of the area to be mapped, determining the apparent locations of physical features by visual reference to their feature points as disclosed on said photograph, determining the true relative locations and elevations of said physical features, and then drafting a uniform scale map by calculating the relative photographically apparent locations of said physical features to their actual relative locations with reference to a chosen datum plane.

18. A method of making a topographical map which consists in obtaining an aerophotograph of the area to be mapped, locating physical features by visual reference to their images disclosed on said photograph, determining and recording on the photograph the relative locations of some of said physical features, determining the elevations of other physical features with reference to a particular datum plane, and then pantographing on map material topographical designations denoting said physical features as map points according to their calculated displacement caused by elements of perspective in the photograph due to terrain relief.

19. The method of making a topographical map which consists in making an aerophotograph, selecting a plurality of points, determining by ground survey the location of said points relative to each other and relative to a chosen horizontal plane, determining the scale of the picture, calculating the relative location of said points according to their ascertained elevation with reference to the particular datum plane, correcting the photograph by optical projection to eliminate elements of perspective and obtain a picture of uniform scale, coordinating the picture into sections and then sketching directly on the photograph topographical designations denoting the feature points and contours.

20. The method of making a topographical map which consists in sketching contour designations on an aerophotograph according to observation and measurement in the field, and then transferring to a distinct sheet the topographical designation of each contour on a ratio according to its elevation components with respect to a chosen datum plane.

21. A photographic map having contour indicia directly traced thereon.

22. A corrected photograph of the earth's surface having directly traced thereon standard designations denoting existing topographical features not otherwise apparent.

23. A combined photographical topographical map.

24. The art of making a topographical map which consists in determining the relative elevations of physical features spread over a given area by identifying said features, and thereafter both measuring and recording the vertical components of their locations on an aerophotograph.

25. The art of making a topographical map which consists in correcting an aerophotograph by eliminating distortion due to perspective, determining by field observation the elevations of physical features spread over a given area and then recording on said aero-photograph the locations of said features shifted to relative positions as though all were of like elevation.

26. The method of making a topographical map which consists in taking an aerophotograph of the territory, locating and marking on the photograph observed topographical data and finally transferring the data to map material.

27. The method of making a topographical map which includes the steps of locating oneself at the place of which a map is desired and then observing and recording topographical data, all by reference to an aerophotograph of the terrain to be mapped and then drafting a map by reference both to the photograph and to the recorded data.

28. The improved method of making a topographical map which consists in taking an aero-photograph to its disclosed area, measuring horizontally and vertically observed physical features, sketching on the photograph topographical designations with relation to feature points thereon and then drafting a map from the data thus collected.

29. The improved method of making a topographical map which consists in taking an aero-photograph to its disclosed area, determining the relative spatial location of observed physical features and then sketching on the photograph contour lines in correct relationship to feature points which appear on the photograph.

30. The improved method of making a topographical map that consists in procuring an aero-photograph of the area intended to be mapped, correcting the photograph for distortion introduced due to the fact that the optical plane of the aero-camera lens was not parallel to the earth's surface at the moment the image of the particular photograph was obtained, locating while on the photographed site ground features common to the reality and to the photograph, and then platting the relative actual locations thereof by making measured recordations directly on the corrected photograph.

31. The improved method of making a topographical map that consists in procuring an aero-photograph of the area intended to be mapped, reproducing an image of the photograph to eliminate possible distortion caused by the aero-lens axis not being perpendicular to a horizontal plane at the moment of exposure, measuring the actual spatial positions of physical features relatively to each other, sketching on the photograph topographical designations in correct arrangement relative to feature points appearing on the photograph, and then transferring the desired data to a separate sheet.

32. The improved method of indicating topography which consists in obtaining an aero-photograph covering a particular area, making the photograph of uniform scale and then sketching topographical indicia thereon according to observation of the measured actual location of physical feature denoted thereby.

33. The herein described method of visually indicating the character of an area of the earth's surface, that consists in marking on an aero-photograph of the particular area and in their apparent relative positions topographical designations of different kinds denoting topographical features.

34. The herein described method of visually indicating the topographical character of an area of the earth's surface, that consists in tracing on topographical designations in their apparent location each to each on an aero-photograph of said area, and then transferring the available data in true relationship upon a separate surface according to survey-ascertained ratios of displacement of the photographically recorded physical features.

35. The herein described method of visually indicating the character of an extensive area of the earth's surface, that consists in drawing contour lines on a uniform-scale aero-photograph of the particular area in their apparent relative positions by direct observation and measurement of elevation variations, and then pantographing said contour lines in true relationship on map material.

36. For use in the art of making a topographical map, the method of adjusting the relative locations of topographical symbols denoting physical features of the terrain, which consists in marking topographical designations on a photograph according to the apparent location of physical features disclosed thereon and then pantographing on a separate sheet a reproduction of said designations according to a pantograph setting involving the factor of the correcting ratio required due to the displacement of said photographed features in consequence of terrain relief.

37. For use in the art of making a topographical map, the method of adjusting the relative locations of topographical symbols denoting physical features of the terrain, which consists in platting topographical designations according to the apparent location of physical features denoted by said designations as revealed by reference to a photograph of the area to be mapped, using a prepared chart to determine the values of the adjusting factors of a pantograph according to predetermined ratios required for correcting photographic displacement of the images of said physical features, and then transferring to a separate sheet by use of a pantograph so adjusted.

38. The use in the art of making a topographical map, of the method of adjusting the relative locations of topographical symbols denoting physical features of the terrain, which consists in platting a plurality of topographical designations which are the determinants of a plane geometric figure according to the apparent location of physical features denoted by said designations as revealed by reference to a photograph of the area comprehending said features, and then, with knowledge of the dimensions and angular relation of two sides of the original plane figure and according to the ascertained actual elevations of said features, transferring a reproduction of said symbols so that they determine a different plane figure.

39. In the art of making a topographical map, the method of adjusting the relative locations of topographical designations denoting physical features of the terrain, which consists in marking a photograph of the particular terrain with coordinate squares, selecting four points on said photograph, determining the dimensions and angular relationship of two sides of the plane geometric figure of which said points are the determinants, providing a chart supplied with coordinate values denoting settings for two arms of a pantograph and further supplied with a diagonal value denoting the dimension of said coordinate squares, ascertaining the correction ratios required to shift the collective disposition of said points from their displaced photographic positions due to varying terrain relief, determining and establishing the setting for the two arms of a pantograph according to said ascertained correcting ratios and finally pantographing the four points to their correct actual relative positions as distinguished from their incorrect photographically apparent relationship.

40. The step in an improved method of visually indicating the topographical character of an area, which consists in sketching on an aero-photograph of said area conventional topographical designations of different kinds and in their apparent relative positions as determined by visual recognition and ground survey of physical features of the area covered by said photograph and which features are denoted by said designations.

41. The method of making a topographical may which consists in obtaining an areophotograph of the terrain of which a map is desired, sketching topographical designations which denote existing physical features on the photographed terrain, and then transferring said designations to map material on an increasing or decreasing ratio according as the elevation of each particular physical feature is learned to be above or below an arbitrarily chosen datum plane.

42. The method of making a topographical map which consists in obtaining an aerophotograph of the terrain of which a map is desired, correcting the photograph by making its component parts of uniform scale, sketching thereon topographical designations which denote existing physical features on the photographed terrain, and then pantographing said designations to map material on a ratio which is the functon of the scale of an horizontal datum plane, of the vertical location of the contour with respect to said plane and of the scale desired for the map.

43. A chart for use in determining the ratios of required adjustment of control points on an aerophotograph, comprising coordinate values denoting elevations, and a diagonal line.

44. A chart for use in correcting for the displacement due to ground relief of a plurality of selected control points disclosed on an aerophotograph, comprising right-angularly related scales of values denoting elevations and used for determining coordinate pantograph settings, and a line extending diagonally across the chart and itself divided by lines denoting a linear scale for determination of a grid dimension.

45. The method of making a topographical map which consists in making an aerophotograph, making the component parts of said photograph of uniform scale, selecting four points on the photograph, determining by ground survey the location of said points relative to each other and relative to a selected datum plane, adjusting the relative location of said points according to their ascertained elevation with reference to the selected datum plane and sketching on the photograph topographical designations denoting the feature points and contours and finally transferring onto map paper on an increasing or decreasing ratio according to the elevation of the physical features denoted by said designations.

46. The method of making a topographical map which consists in taking an overlapping series of aerophotographs, selecting a plurality of feature points on each, determining by standard survey practice the location of said points relative to each other and relative to a chosen horizontal or datum plane, determining the scale of the picture including the step of platting the points, locating the center of said picture, transferring such center to its proper place between said selected points, scaling the distances from the determined center to each of the selected points, multiplying each distance by the difference between the elevations of the datum plane and each one of the selected points respectively, dividing each of the products by the altitude at which the aerophotographs were taken, laying off the quotients so obtained by measurement from the center of the plat, correcting the photographs to obtain pictures of uniform scale, coordinating the pictures into plane geometric figures, recording directly on the photographs the feature points and contours and finally pantographing all the photographs as a continuous series onto map paper to obtain the proper relative location of the topographical designations.

47. A method of making maps which consists in obtaining for use a single aerophotograph of each particular area to be mapped, directly locating by observation of the terrain area itself, and recording pertinent data relative to, terrain map points as actually disclosed, and then constructing with the aid of said recordations a map of substantially uniform scale.

48. A method of making a topographic map by use of a series of overlapping aerophotographs, which consists in using a single aerophotograph of each particular portion of the area to be mapped, directly locating by observation of the actual area, and recording pertinent data relative to, terrain map points as actually disclosed, and then constructing with the aid of said recordations a map of substantially uniform scale and comprehending the recorded data of the used portions of all of the aerophotographs.

49. The method of correcting the disclosure of an aerophotograph comprehending a terrain area by elimination of elements of vertical perspective, which consists in collectively shifting in directions substantially radial to the vanishing point of vertical perspective the position of images of physical features which are to constitute map points according to their calculated displacement caused by the perspective factor due to terrain relief and then drafting a map depicting the map points so shifted.

50. A method of making a map which consists in obtaining an aerophotograph of the area to be mapped, identifying map points on the terrain by comparison with their images on said photograph, recording the real relative locations of said map points and then drafting a map with the photographically apparent positions of said map points adjusted to and depicted in their correct relative locations.

51. A method of making a topographical map which consists in obtaining an aerophotograph of the area to be mapped, identifying real physical features, contemplated for use as map points and constituting data customarily used in drafting a map, by reference to images thereof as disclosed on said photograph, estimating and recording the topographical locations of said map points, and then drafting a uniform scale map by adjusting the photographically apparent relative locations of said map points to their true relative locations with reference to a chosen substantially horizontal datum plane.

52. In the art of making a topographical map, the method of adjusting the relative locations of photographic images of physical features of the terrain, which consists in marking a photograph of the particular terrain with a plane geometric figure, selecting four points on said photograph three of which are determinants of said figure, determining the dimensions and angular relationship of two sides of the plane geometric figure of which said points are the determinants, providing a chart supplied with coordinate values denoting settings for two arms of a pantograph and further supplied with a diagonal value denoting dimensions of said plane figure, ascertaining the correction ratios required to shift the collective disposition of said points from their displaced photographic positions due to varying terrain relief, determining and establishing the setting for the two arms of a pantograph according to said ascertained correcting ratios, pantotgraphing the four points to their correct actual relative positions as distinguished from their incorrect photographically apparent relationship and finally supplying topographical designations in accordance with the ascertained ratios of displacement.

53. The method of making a topographical map which consists in obtaining aerophotographic records of the terrain of which a map is desired, sketching thereon topographical designations which denote by emphasis and amplification physical features on the photographed terrain, and then transferring said designations to map material in such a way that the variance in relative locations of the designations on the aerophotographic records with respect to those as transferred on the map material is a function of the altitude of the aerophotographic recorder above an assumed datum plane, the focal length of the lens of the aerocamera, and the positions of the designations with respect both to the ground point in the lens axis and the point vertically below the lens at exposure and the scale for the finished map.

54. A method of making a map which consists in obtaining an aerophotograph of the area to be mapped, identifying map points on the terrain by comparison with their images on the said photograph, determining the elevations of said map points, and then making a map by drafting disclosures of the photograph and the relative elevations as above determined.

55. The steps in the art of making a topographical map which consists in determining the actual location of any desired map point by identification of the image of the physical feature denoted by said map point on a single photograph and by observation and ascertainment of its true elevation and then recording a topographical designation of said map point shifted from its photographically apparent position to its correct position with respect to any chosen datum plane.

56. The art of making a topographical map which consists in obtaining an aerophotograph of the terrain to be mapped, altering the apparent relative locations of map points disclosed by said photograph by eliminating elements of horizontal perspective partially to correct the photograph, determining the actual location of any map point by identification of the physical feature corresponding to it on said corrected photograph and by observation and ascertainment of its true elevation and then recording a topographical designation of said map point additionally shifted in position relative to other map points.

57. The steps in the method of making a topographical map which consists in obtaining an aerophotograph, ascertaining the actual elevation of a desired map point appearing on said photograph, ascertaining the photographical displacement of said map point in consequence of its difference in elevation with respect to other map points and then recording a topographical designation of said map point shifted to its correct position.

58. The method of making a topographical map which consists in, identifying map points by reference to an aerophotograph of the terrain to be mapped, ascertaining the approximate elevation of desired map points, determining the calculated photographical displacement of said map points in consequence of their respective elevations and then recording topographical designations of said map points shifted to their correct positions relatively to each other according to any consistently applied system of dimensional representation.

59. The method of making a topographical map which consists in, obtaining an aerophotograph of the terrain of which a map is desired, identifying map points by reference to said aerophotograph, ascertaining the actual elevation of desired map points, calculating the photographical displacement of said map points in consequence of their respective elevations relative to a chosen datum plane, recording on said photograph topographical designations of said map points shifted to their correct position relatively to each other and finally transferring to a map sheet all the desired map points in their correct relative positions.

60. The steps in the art of making a topographical map which consists in obtaining an aerophotograph of the terrain of which a map is desired, and recording a shifted location of any once photographically recorded map point according to its ascertained elevation with reference to an adopted datum plane.

61. The art of making a topograhpical map which consists in obtaining an aerophotograph of the terrain of which a map is desired, and shifting the relative location of desired map points according to their differing elevations with reference to an adopted datum plane while transferring to map paper.

62. The art of making a topographical map which consists in obtaining an aerophotograph of the terrain of which a map is desired, altering the relative locations of map points by rephotography to eliminate elements of horizontal perspective in consequence of an inclined optical axis at the moment said photograph was obtained, and additionally shifting the location of a desired map point according to its ascertained elevation with reference to an adopted datum plane by transference to map paper.

63. The method of making a topographical map by drafting map points according to the true relative locations of physical features of the desired terrain after calculation and graphical shifting of map points denoting said features from single aerophotographed images of the latter.

64. The method of making a topographical map by drafting map points which denote physical features of the terrain of which a map is desired according to the shifted relative locations of said features as disclosed by an aerophotograph which has been corrected by the elimination of all elements of perspective.

65. The method of making a topographical map which consists in obtaining an areophotograph of the terrain of which a map is desired, eliminating elements of horizontal perspective from said photograph, eliminating elements of vertical perspective in said photograph, said elimination procedures determining relocations of said physical features relatively to each other and then drafting a map having topographical designations denoting map points coresponding to said physical features and arranged in correct relation to each other with reference to a particular chosen datum plane and a desired scale.

66. The method of making a topographical map which consists in obtaining an aerophotograph of the terrain of which a map is desired, relocating physical features, which are distorted in consequence of elements of horizontal perspective in said photograph, by recording appropriate indicia thereof, relocating physical features, which are displaced in consequence of elements of vertical perspective in said photagraph, by recording appropriate indicia thereof and then drafting a map having topographical designations denoting map points corresponding to said physical features and arranged in correct relation to each other with reference to a chosen datum plane, and according to a desired scale.

67. The method of making a topographical map which consists in obtaining an aerophotograph of the terrain of which a map is desired, ascertaining the photographical displacement of physical features because of elements of horizontal perspective in said photograph due to an inclined optical axis when said photograph was obtained, recording appropriate indicia thereof in positions altered according to said ascertainment, ascertaining the photographical displacement of physical features because of elements of vertical perspective in said photograph due to terrain relief, recording appropriate indicia thereof in positions altered according to said second ascertainment, and then drafting a map having topographical designations denoting map points corresponding to said physical features and arranged in correct relation to each other subject to an application of said ascertainments.

68. The method of making a topographical map which consists in obtaining an aerophotograph of the terrain of which a topographical map is desired, correlating the intelligence furnished thereby by recording map points, contours and other topographical data aided by a determination of the actual location and character of physical features comprehended by said photograph.

69. The method of making a topographical map which consists in obtaining an aero- photograph of the terrain of which a topographical map is desired, correlating the intelligence furnished thereby by sketching map points, contours, and other topographical data aided by a determination of the relative locations and elevations of physical features of the terrain disclosed by said photograph and then drafting a comprehensive map, correctly showing all of the desired information.

Signed by us, this first day of September, 1922.

EDWIN H. CORLETT.
MAX W. GARNETT.
HOWARD I. DOREMUS.